UNITED STATES PATENT OFFICE.

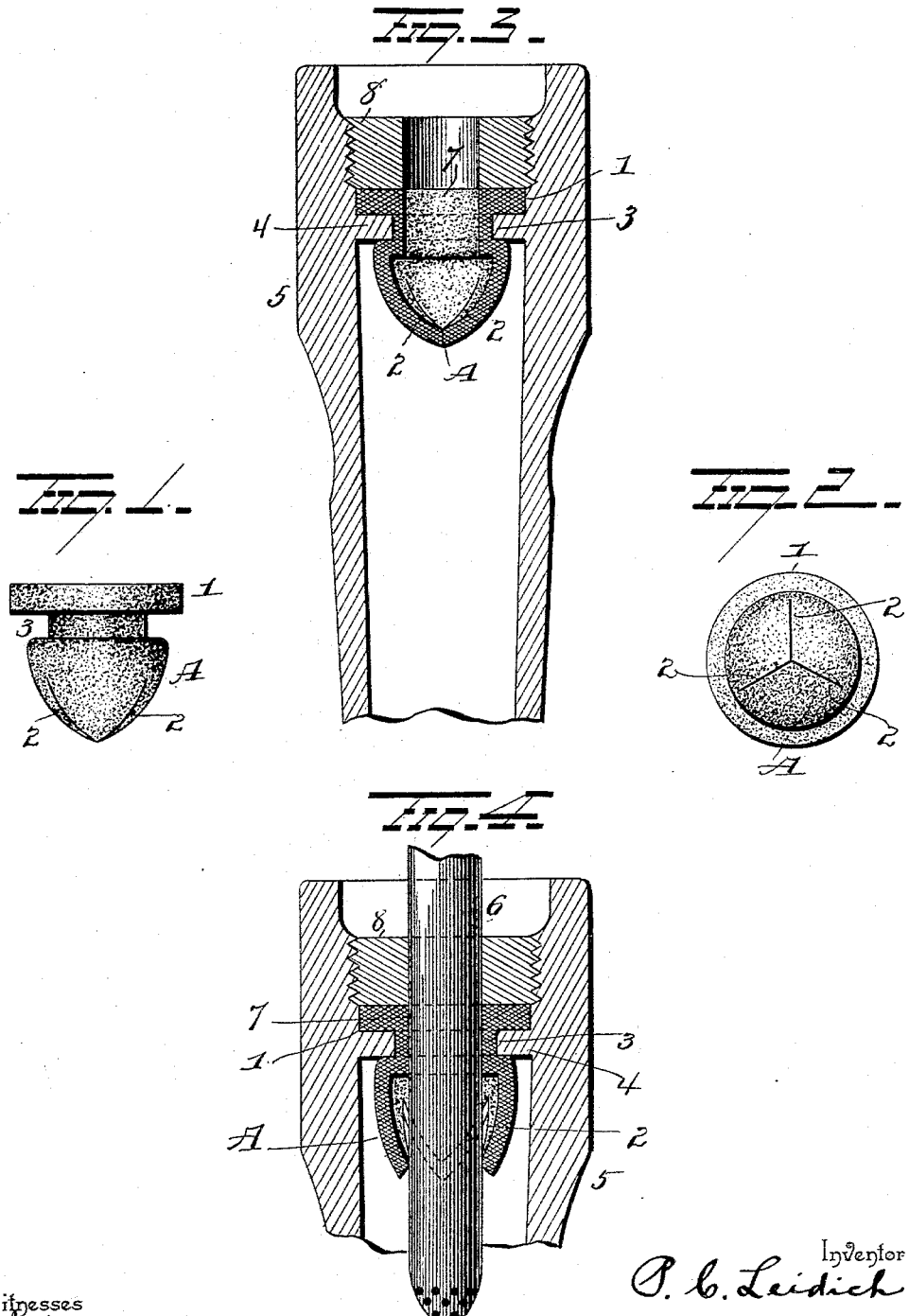

PETER C. LEIDICH, OF TAMAQUA, PENNSYLVANIA.

AUTOMATIC VALVE FOR BEER-TAPS.

SPECIFICATION forming part of Letters Patent No. 584,091, dated June 8, 1897.

Application filed January 21, 1897. Serial No. 620,100. (No model.)

*To all whom it may concern:*

Be it known that I, PETER C. LEIDICH, a resident of Tamaqua, in the county of Schuylkill and State of Pennsylvania, have invented certain new and useful Improvements in Automatic Valves for Beer and other Liquid Taps; and I do hereby declare the following to be a full, clear, and exact description of the invention, such as will enable others skilled in the art to which it appertains to make and use the same.

My invention relates to an improvement in automatic valves for beer and other liquid taps, the object being to provide a simple and inexpensive valve that will prevent the accidental escape of air, gas, or fluid from the barrel or cask during the process of tapping.

A further object is to so construct the valve that it will also perform the function of the washer common in taps now in use.

A further object is to construct the valve in such manner that it can be easily and quickly removed when worn or otherwise damaged.

With these ends in view my invention consists in certain novel features of construction and combinations of parts, as will be hereinafter more fully described, and pointed out in the claims.

In the accompanying drawings, Figure 1 represents a detached view of my improvement. Fig. 2 is a bottom plan view of same. Fig. 3 is a view illustrating the position of valve in a tap; and Fig. 4 is a similar view, the valve being in its open position.

In the drawings I have illustrated the body portion of a tap provided with the usual annular shoulder common to taps now in everyday use, whereby the exact location and operation of my improved valve may be more clearly understood.

A represents my improved valve, and 1 the annular flange thereof. The valve A is preferably oval in form or shaped to conform to an inverted arch and is provided with a series of slits 2, which latter begin at the bottom thereof and extend a suitable distance up the sides thereof, dividing the valve into three or more yielding lobes. Between valve A and flange 1 is formed an annular recess 3, which is adapted to receive the shoulder 4, formed in body portion of tap 5, by means of which the valve is held against accidental displacement. When the valve is in the position described, it will be apparent that an absolute seal is obtained and that the escape of gas, air, or fluid from the barrel or cask during the operation of driving the tap through the bung is absolutely prevented. This object is accomplished by reason of the peculiar construction of valve, the tendency of which is to close tightly when external pressure is exerted upon it by the impinging gas, air, and liquid from the lower portion of the tap.

After the tap has been driven home into the cask or barrel the siphon-tube 6 is inserted within the top of said tap and is then driven into the barrel or cask in the usual manner and during its passage passes through the opening 7 in valve A and forces the slit sections thereof outwardly. The inner walls of these slit sections 2 when in their expanded position hug the exterior surface of the siphon-tube, while their exterior faces hug the interior surface of the tap, thus forming a seal against the escape of air, gas, or liquid after the tap and siphon-tube have been driven home. In the event the outer faces of slits 2 when in their expanded position fail to tightly hug the interior surface of the tap the tight joint formed at annular shoulder 4 will suffice to prevent the escape of air, gas, or liquid between the siphon-tube and the tap.

In the taps in common use a seal against the escape of air, gas, and liquid between the siphon-tube and tap has been effected by the employment of a yielding washer, which latter is usually interposed between the annular shoulder 4 and the threaded plug 8, but in the employment of my improved valve this washer is dispensed with, as the broad annular flange accomplishes the object of the washer as well as the function of preventing the valve from being pushed downwardly within the tap during the passage of the siphon-tube.

It will be apparent from Fig. 3 and the foregoing description that the plug 8 is not necessary in order to retain the valve in its normal position, as such position will at all times and under all conditions be maintained by reason of the annular shoulder being supported within the annular recess 3.

The entire valve may be constructed of any suitable yielding material, but for ordinary purposes I prefer to construct same of red rubber.

Having fully described my invention, what I claim as new, and desire to secure by Letters Patent, is—

1. As an article of manufacture, a valve for beer or other liquid taps composed of rubber or similar material and constructed with a cylindrical portion which conforms to and fits the tap and is then widened immediately below the cylindrical portion, and provided with lobes connected with this cylindrical portion at the outer end thereof, after which the lobes extend inwardly toward each other to form the substantially arch-shaped lower portion.

2. The combination with a tap having an internal annular shoulder, of an elastic valve provided with an annular recess which receives the annular shoulder and lobes extending outward beneath the annular shoulder and thence toward each other, the tap having a space outside of the lobes for the lobes to retreat into when the tube is withdrawn.

3. As an article of manufacture, a valve for beer or other liquid taps composed of rubber or similar material and constructed with a cylindrical portion which conforms to and fits the tap and widened immediately below the cylindrical portion, said valve having a lobe connected with this widened portion at a suitable distance from the bore of the cylindrical portion so that a space is left therebetween, after which it extends inwardly toward the remaining portion of the valve.

In testimony whereof I have signed this specification in the presence of two subscribing witnesses.

PETER C. LEIDICH.

Witnesses:
C. S. DRURY,
GEORGE F. DOWNING.